(12) United States Patent
Souza et al.

(10) Patent No.: US 7,910,230 B2
(45) Date of Patent: Mar. 22, 2011

(54) HIGH RESISTANCE GYPSUM PARTS AND PREPARATION METHOD TO OBTAIN THESE PARTS

(75) Inventors: Milton Ferreira de Souza, Sao Carlos (BR); Hebert Luis Rossetto, Sao Carlos (BR); Wellington Massayuki Kanno, Sao Carlos (BR)

(73) Assignee: Inovamat, Inovacao Em Materiais Ltda., Sao Carlos (BR)

( * ) Notice: Subject to any disclaimer, the term of this patent is extended or adjusted under 35 U.S.C. 154(b) by 213 days.

(21) Appl. No.: 12/067,803

(22) PCT Filed: Sep. 21, 2006

(86) PCT No.: PCT/BR2006/000192
§ 371 (c)(1),
(2), (4) Date: Mar. 21, 2008

(87) PCT Pub. No.: WO2007/033452
PCT Pub. Date: Mar. 29, 2007

(65) Prior Publication Data
US 2008/0250982 A1 Oct. 16, 2008

(30) Foreign Application Priority Data
Sep. 21, 2005 (BR) .................................... 0506033

(51) Int. Cl.
*C04B 11/00* (2006.01)
*C04B 7/00* (2006.01)
*B32B 13/00* (2006.01)

(52) U.S. Cl. ........ 428/703; 106/732; 106/735; 106/786; 423/555

(58) Field of Classification Search ........................ None
See application file for complete search history.

(56) References Cited

U.S. PATENT DOCUMENTS

| 1,973,473 | A | * | 9/1934 | Edwards | 423/555 |
| 3,820,970 | A | * | 6/1974 | Watkins | 71/1 |
| 4,377,414 | A | * | 3/1983 | Buschmann et al. | 588/257 |
| 5,482,551 | A | * | 1/1996 | Morris et al. | 106/772 |
| 5,785,751 | A | * | 7/1998 | Bashlykov et al. | 106/725 |
| 5,964,934 | A | * | 10/1999 | Englert | 106/287.1 |
| 6,841,232 | B2 | * | 1/2005 | Tagge et al. | 428/304.4 |
| 6,902,797 | B2 | * | 6/2005 | Pollock et al. | 428/304.4 |
| 7,294,189 | B2 | * | 11/2007 | Wantling | 106/164.3 |
| 2004/0092624 | A1 | * | 5/2004 | Tagge et al. | 524/42 |
| 2004/0175321 | A1 | * | 9/2004 | De Souza et al. | 423/335 |

FOREIGN PATENT DOCUMENTS

EP 260342 A * 3/1988

(Continued)

OTHER PUBLICATIONS

Ridge, M.J. and Beretka, J., Calcium Sulfate Hemihydrate and Its Hydration, Rev. Pure and Appl. Chem., 19, 17-44 (1969).

(Continued)

*Primary Examiner* — Aaron Austin
(74) *Attorney, Agent, or Firm* — Ganz Law, PC

(57) ABSTRACT

The preparation of gypsum parts (dihydrate calcium sulfate) with high mechanical strength is obtained with the aid of water layers with nanometric thickness. Calcium sulfate is used, dihydrate as well as hemihydrate, to obtain parts from these two materials, pure or mixed, especially to use in construction work, where the parts are prepared by compressing their slightly humidified powders.

5 Claims, 3 Drawing Sheets

FOREIGN PATENT DOCUMENTS

WO     WO 02066372 A1 * 8/2002

OTHER PUBLICATIONS

Michot, L.J., et al. "Water organization at the solid-aqueous solution interface" C.R. Geoscience 334, 611-631(2002).
Silverstein, K.A.T., et al., "The Strength of Hydrogen Bonds in Liquid Water and Around Nonpolar Solutes" J. Am. Chem. Soc., 122, 8037-8041 (2000).
Teixeira, J., et al., "Water in confined geometries", Physica B 234-236, 370-374 (1997).
Henderson, M. A., "The interaction of water with solid surfaces: fundamental aspects revisited", Surf. Sci. Rep. 46, 1-308 (2002).
Gallo, P., et al., "Slow Dynamics of Water Molecules in Supercooled States", Phys. Ver. Lett. 76, 2730-2733 (1996).
Bellisent-Funel, M.-C. et al. "Single-particle dynamics of water molecules in confined space", Phys. Rev. E, 51, 4558-4569 (1995).
Garbassi, F. et al. "Polymer Surfaces, from Physics to technology", John Wiley & Sons, Chichester, England, 1994, Chapter 4, pp. 161-199.
Wachtman, J. B. "Mechanical Properties of Ceramics" John Wiley & Sons, Inc., New York, 1996; pp. 171-199.

* cited by examiner

Figura 3 A

HIGH RESISTANCE GYPSUM PARTS AND PREPARATION METHOD TO OBTAIN THESE PARTS

RELATED APPLICATIONS

This application is submitted under 35 U.S.C. 371 as a U.S. National Phase application of International Patent Application Number PCT/BR2006/000192, filed Sep. 21, 2006, which claims priority to Brazil Patent Application Serial Number PI0506033-8, filed Sep. 21, 2005, the contents of which are each hereby incorporated by reference as if recited in full herein for all purposes.

BACKGROUND

State of the Art

The mechanical resistance of gypsum, calcium sulfate dihydrate (DH), prepared by a humidification process followed by compacting (named UMIPAC by the present inventors), attains elevated values, when compared with plaster produced by the process involving the suspension of calcium sulfate hemihydrate in water (HH) [Milton Ferreira de Souza, Brazilian patent "Gypsum and composites with high mechanical resistance and low permeability and its manufacturing process"—filed at INPI on Sep. 9, 2003, PI 0303814-9 and Milton Ferreira de Souza, Brazilian patent "Phosphogypsum and its admixtures with mineral plaster: raw material for the production of gypsum parts and preparation methods"— filed on Jan. 9, 2004, record number 002931; Ridge, M. J. and Beretka, U., Calcium Sulfate Hemihydrate and Its Hydration, Rev. Pure and Appl. Chem., 19, 17-44 (1969)].

In the suspension method the ratio between water and hemihydrate W/HH, is over 0.30, typically between 0.60 and 1.0, while for the above method (UMIPAC), the W/HH value is comprised between 0.25 and 0.18. After the compaction process of the moistened HH, in the lack of a retardant, hydration ensues. Such hydration contributes toward the formation of a DH solid form, whose microstructure is made up of crystals, pores and canaliculus, as can be seen in FIG. 1, where the microstructure of a gypsum plaque was obtained from moistened HHβ in a W/HH=0.20 ratio, compacted at 10 MPa. Hydration results from the water distribution along the entire compacted HH microstructure, thus enabling that at a microscopic level the process of HH dissolution and its re-precipitation as DH takes place [Ridge, M. J. and Beretka, J., op. cit.]. As a result of compaction, the approximation of the calcium sulfate dihydrate crystals, DH, increases when compared to the crystals produced by the suspension process. Such increase allows for greater adherence among these crystals. Due to the hydrophilic nature of the gypsum and the presence of non-structural water, it can be assumed that the force responsible for the adherence between plaster crystals occurs on account of the bonds by way of hydrogen bridges. The scientific literature does not mention specific studies demonstrating how the hydrogen bridges operate in plaster of high mechanical resistance. In minerals, such as clays, the physical-chemical properties were associated to hydrogen bridges by many researchers [Michot, L. J., Villiéras, F., François, M., Bihanmic, I., Pelletier, Manuel, Cases, J. M, "Water organization at the solid-aqueous solution interface" C. R. Geoscience 334, 611-631 (2002)]. According to the scientific literature [Silverstein, K. A. T., Haymet, A. D. J., and Dill, K. A, "The Strength of Hydrogen Bonds in Liquid Water and Around Nonpolar Solutes" J. Am. Chem. Soc., 122, 8037-8041 (2000); Teixeira, J., Zanotti, J.-M., Bellisent-Funel, M.-C., Chen, S.-H., "Water in confined geometries", Physica B 234-236, 370-374. (1997); Henderson, M. A., "The interaction of water with solid surfaces: fundamental aspects revisited", Surf. Sci. Rep. 46, 1-308 (2002); Gallo, P., Scortino, F., Tartaglia, P., & Chen, S. H., "Slow Dynamics of Water Molecules in Supercooled States", Phys. Ver. Lett. 76, 2730-2733 (1996) e Bellisent-Funel, M.-C., Chen, S. H., & Zanotti, J. M., "Single-particle dynamics of water molecules in confined space", Phys. Rev. E, 51, 4558-4569 (1995)], the hydrogen bridges become more stable the closer they are to the hydrophilic surfaces. It is worth mentioning that such stability extends to no more than 15 water molecules, which is equivalent to 1.50 nanometers.

The U.S. Pat. No. 5,482,551, of 9.1.1996, is also about reinforced gypsum, with reduced water, in the manufacturing of fire resistant parts by extrusion process.

DESCRIPTION OF THE INVENTION

Due to the hydrophilic nature of gypsum, it can be considered that the water added to HH prior to compaction is employed: (i) in the hydrating process, (ii) in the covering of the DH crystal surfaces by a fine water layer, which will be denominated as interstitial water and (iii) in the formation of hydrogen bridges among the plaster crystals. Most of the water is used in the HH hydrating process. The non-structural water present in gypsum, i.e., that small fraction of water that does not belong to the DH crystalline structure, determines a large part of the mechanical and electrical properties of the gypsum parts prepared by our own method of humidification, compaction and drying (named UCOS by the present inventors). Only water molecules with reduced dynamics that are part of the hydrogen bridges contribute toward adherence among DH crystals, i.e., for the mechanical resistance of the gypsum parts. Reduction of interstitial water, meaning that non-structural water that also does not participate in the hydrogen bridges, contributes toward increase of the mechanical resistance, as the experiments performed indicate and which results are shown in Table 1. After compaction, the sample A rested for 24 hours in a sealed environment at room temperature, and underwent a 5.0 loss of the added water in spite of the conditions, and thus it contained interstitial water. Sample B was dried at room temperature, where there was an additional interstitial water loss of 5.5% (Table 1). Water loss results in a mechanical resistance and electrical resistivity increase. Drying performed at 50° C. enables more interstitial water to be eliminated, thus increasing even more gypsum's mechanical resistance (sample C). Continued drying makes "hydrogen bridges whose water molecules have reduced dynamics" appear when the capillary pressure is diminished among the crystals, i.e., those that contribute toward adherence. On the other hand, if drying takes place in high temperatures for long periods of time, there is a loss of structural water, which leads to significant decreasing of gypsum's mechanical resistance. Table 1 shows that gypsum's drying at temperatures below 70° C., preferably between 60 and 50° C., eliminates a large quantity of the interstitial water, the one that does not occupy a structural position, nor belongs to the hydrogen bridges with reduced dynamics, causing increase on gypsum mechanical and electrical resistance. Drying considerably increases the mechanical resistance to compression and bending of the compacted plaster, when compared to the value of a humid plaster part mechanical resistance.

TABLE 1

Resistance to compression, $\sigma_c$, and bending, $\sigma_b$; Density and Loss of Water, PA, % of added water, of gypsum bars (DH) prepared by our (UCOS) method: humidification of HHβ powder, W/HH = 0.20; compaction at 10 MPa and drying. TS, drying at different temperatures for 24.0 h.

| Samples # | TS (° C.) | $\sigma_c$ (MPa) | $\sigma_b$ (MPa) | PA (%) | Density (g/cm³) |
|---|---|---|---|---|---|
| A  | 25 | 22 ± 3 | 7 ± 1   | −5.0  | 1.94 ± 0.02 |
| B  | 25 | 43 ± 3 | 15 ± 1  | −10.5 | 1.92 ± 0.02 |
| C  | 50 | 65 ± 3 | 23 ± 1  | −16.0 | 1.88 ± 0.02 |
| D  | 60 | 63 ± 3 | 22 ± 1  | −16.3 | 1.87 ± 0.02 |
| E  | 70 | 29 ± 3 | 10 ± 1  | −30.0 | 1.84 ± 0.02 |
| F  | 80 | 8 ± 2  | 1.5 ± 0.5 | −85.0 | 1.67 ± 0.02 |
| C1 | —  | 24 ± 3 | 8 ± 1   | +15.0 | 2.03 ± 0.02 |
| C2 | 50 | 65 ± 3 | 23 ± 1  | −16.0 | 1.88 ± 0.02 |
| A* | —  | 48 ± 3 | 15.5 ± 1 | −5.0 | 1.94 ± 0.02 |
| C* | —  | 78 ± 3 | 27 ± 1  | −16.0 | 1.88 ± 0.02 |

Sample A was kept inside a thick plastic bag for 24 h as it was compressed until mechanical measurements were performed; Sample B was dried at 25° C. under air flow for 24 h; samples C, D, E and F were dried in an stove at 50, 60, 70 and 80° C., respectively, for 24 h. Sample C1 refers to sample C re-hydrated, while sample C2 refers to sample C1, dried at 50° C. for 24 h. Samples A* and C* refer to samples A and C, respectively, tested at minus 15° C.

It was observed that interstitial water loss at 50° C. is evidenced by the reduction of plaster parts dimensions in 0.15%, i.e., plaster crystals approximate during drying. The reverse effect, re-hydration of a dried plate at 50° C., results in an increase of ≈0.15% of the sample dimensions, i.e., the crystals withdraw as a consequence of capillary pressure of the water among the DH crystals. Drying of the plaster for a long period of time, as occurred with the mineral plaster deposits, known as alabaster, confer resistivity to the alabaster, ρ, greater than $10^{13}$ Ωm and also, greater mechanical resistance. The results of these experiments indicate that the hydrogen bridges connecting the plaster crystals possess "reduced dynamics" in relation to liquid water. The measurements of mechanical resistance of samples A and C at low temperatures, −15° C., samples A* and C* respectively, demonstrate that the mechanical resistance of sample A increases by 120% in relation to a measurement performed at 25° C., while sample C undergoes a much lesser increase of 20%. This result indicates that in sample A*, the number of hydrogen bridges with reduced dynamics contributing toward a mechanical resistance, had a significant increase.

The increase observed in sample C* was smaller due to the fact that a great amount of water was already part of the "hydrogen bridges with reduced dynamics". The result of sample C* demonstrates that a small quantity of the water is not part of the "hydrogen bridges with reduced dynamics" and if it is dried at 50° C. for a longer period of time, it should increase even more its mechanical resistance, which in fact was observed throughout our experiments. In the present UCOS method, the low value of W/HH confers to the HH powder a rheologic behavior, similar to a material with plasticity, which enables its compaction to come about by steps. The first compaction step approximates the HH crystals, allowing that an adherence by "hydrogen bridges with reduced dynamics" establishes among some of them, responsible for the compact's green resistance. The compactions that follow will increase the contact among the HE crystals, thus, increasing the number of "hydrogen bridges with reduced dynamics". In the hydrating process of HH such crystals are dissolved, with the formation of a new network of contacts, this time among the DH crystals that are formed. The outcome of the DH crystals growth is one of impact among them, which can be seen by the part dimensions increase in ≈1.8±0.3%, i.e., the hydration of compacted HH, under the conditions described in Table 1, results in a DH plate with dimensions that are 1.8 W larger than that of the compacted HH plate.

Taking into consideration that the adherence among DH crystals, as well as those of HH, is carried out by hydrogen bridges, it is possible to prepare DH parts directly from the powder of this material, without intermediation of the hydrating process. In order to do this, the DH powder is slightly moistened and afterwards is strongly compacted. Similarly, it is possible to prepare solid plates of HH. In both cases high pressures should be applied, since densification superior to 90% is necessary, preferentially equal to or above 94%. When very high pressures are applied, the DH crystals can undergo plastic deformation, as seen in FIG. 2. However, if the DH powders (or HH powders) are not moistened, even high pressures will not be sufficient to produce a solid form. The hydrophilic nature of HH and DH crystals and of substances such as polyvinyl alcohol, polyvinyl acetate, polyacrilates, and formaldehyde-based resins with urea, phenol or melamine and others with similar properties, cause these substances to directly participate in the adherence process among DH or HH crystals when admixed into them. Such substances can substitute or complement the hydrogen bridges' function involving water only in the adherence process. The reinforcement against crack propagation is made by polymeric fibers with hydrophilic properties, for example: cellulose fibers in general, microcellulose and nanocellulose fibril, polyvinyl alcohol fibers, among others. Fibers with hydrophobic properties, as those of polypropylene, that have their surface treated to exhibit hydrophilic behavior, can also contribute towards adherence [F. Garbassi, M. Morra, E. Occhiello, "Polymer Surfaces, from Physics to technology", John Wiley, Chichester, England, 1994]. Even polypropylene fibers, whose surfaces have not been treated may contribute toward resistance increase to crack propagation in high compaction gypsum, by means of a process of crack deflection along its length [J. B. Wachtman, "Mechanical Properties of Ceramics" John Wiley, New York, 1996].

SUMMARY

The inventive subject matter is directed to high strength gypsum parts and preparation methods to obtain these parts. In one embodiment the preparation method of the gypsum parts may be characterized by adhesion of the DH or the HH crystals by hydrogen bonds, which is also known in the art and may be referred to herein as "hydrogen bridges". In the foregoing embodiment the hydrogen bonds may be obtained by thin layers of water in nano and sub-nanometric scale. In the foregoing embodiment the hydrogen bonds between hydrophilic surfaces may be "hydrogen bonds with reduced dynamics" among water molecules. In the foregoing embodiment the method may be characterized by the reduction of the dynamics of water molecules not surpassing thicknesses higher than 3.0 nanometers, such thickness measured between two hydrophilic surfaces. In the foregoing embodiment the method may be characterized by the hydrogen bonds being composed, besides the water molecules, by other inorganic or organic molecules located between the hydrophilic surfaces.

In another embodiment the preparation method of the gypsum parts to increase compressive and bending strength may be characterized by the steps of humidification followed by compaction and drying (UCOS), such drying with the purpose of allowing that the DH or HH crystals approximate among them, thus establishing a larger number of "hydrogen bridges with reduced dynamics". In the foregoing embodiment the method may be characterized by the drying taking place at about 20 to 70° C.

In another embodiment the preparation method of gypsum parts that have HH powder from mineral origin or from chemical processes as the starting material may be characterized by the following steps: (i) humidification of HH powder; (ii) compaction of humidified powder; (iii) drying at temperatures around 20 to 70° C. In the foregoing embodiment the method may be characterized by the drying being performed preferably between 60 and 50° C. In the foregoing embodiment the method may be characterized by the drying time of about 1.0 to 48 h and being preferably between 2 and 12 h. In the foregoing embodiment the method may be characterized by the additional step(s) of surface treatment by means of paints, resins or sealing substances. In the foregoing embodiment the method may be characterized by the humidification consisting of aspersion of water droplets in a mass ratio, between water and hemihydrate (Water/HH), between 0.25 and 0.12, preferably between 0.20 and 0.16. In the foregoing embodiment the method may be characterized by the compaction being performed by applying pressure to the humidified mixture. In the foregoing embodiment the compaction may be characterized by the pressure being uniaxial, biaxial, isostatic or uniaxial compaction by means of modules with pairs of densification rolls, similar to what occurs in lamination process. In the foregoing embodiment the method may be characterized by the compaction being optionally attained in more than one step, by controlling the hydration time by means of retardant substances of the hydration process. In the foregoing embodiment the method may be characterized by the retardant substance being citric acid. In the foregoing embodiment the method may be characterized by the drying starting after the end of HH hydration and the drying time taking place in such a manner that dehydration of DH does not occur. In the foregoing embodiment the method may be characterized by providing gypsum where a fraction of HH crystals is present. In the foregoing embodiment the method may be characterized by the presence of HH after the hydration process. In the foregoing embodiment the method may be characterized by HH presence occurring due to ejection of water during compaction. In the foregoing embodiment the method may be characterized by the Water/HH ratio being equal or less than 0.186. In the foregoing embodiment the method may be characterized by using hemihydrates of mineral plaster or chemical plaster, such as phosphoplaster. In the foregoing embodiment the method may be characterized by the adherence among the crystals occurring by means of hydrophilic polymers. In the foregoing embodiment the method may be characterized by the plaster mixture containing vegetal residues. In the foregoing embodiment the method may be characterized by the vegetal residues containing lignocellulosic fibers. In the foregoing embodiment the method may be characterized by the lignocellulosic fibers being, fibers of paper, pineapple leaves, bamboo and other vegetal substances. In the foregoing embodiment the method may be characterized by the vegetal residues being made up of wood powder or coconut powder and fiber. In the foregoing embodiment the method may be characterized by the mixture being able to attain up to 95% in gypsum weight.

In another embodiment the preparation method of gypsum parts may include the steps of (i) individualization of residue particles or fibers; (ii) moistening of the particles and/or fibers by an acetate polyvinyl based glue suspension, or acrylic resins, or urea-formaldehyde or phenol-formaldehyde, incorporating between 1 and 5% glue weight in relation to the weight of the composite; (iii) mixing HH to the humidified fiber/particles, preferably in a quick fluidized-bed mixer and, simultaneously, incorporating between 20 and 35% weight of water, preferably 25% weight, of water to the mixture, such water containing substances such as sodium benzoate, able to protect the fibers from microbiological attack; (iv) compaction; and (v) drying between 20 and 70° C. In the foregoing embodiment the method may be characterized by the plaster mixture being useful for the preparation of inorganic plaster-material composites such as gypsum-sand, gypsum-granite powder or other inorganic residues compatible with gypsum.

In another embodiment the preparation method of gypsum parts may comprise the steps of (i) granulometric selection of inorganic material; (ii) moistening of the inorganic powder by an adhesive suspension such as acetate polyvinyl or urea-formaldehyde resin, with additives that will transform the adhesives insoluble after drying; (iii) mixture of HH powder already humidified, W/HH relation around 0.18, preferably in quickly fluidized-bed mixer, —(iv) compaction; (v) drying. In the foregoing embodiment the method may be characterized by a gypsum mixture incorporating lignocellulosic fibers, such as caraua, sisal, pineapple leave fibers, paper, cellulose microfibril/nanofibril or synthetic fibers, as polyvinyl alcohol fibers, protected against microbiological attack by sodium benzoate or equivalent substances, and polypropylene fibers. In the foregoing embodiment the method may be characterized by comprising an uniform mixture of the fibers in the gypsum, preferably with method steps that include: (1) separating fibers; (ii) covering the lignocellulosic fiber with a hydrophilic adhesive, as for example, urea-formaldehyde resin; (iii) progressive mixture of humidified plaster to the fibers; (iv) compaction; and (v) drying.

In another embodiment the preparation method of gypsum parts may be characterized by preparing the gypsum parts by direct compaction between 30 and 100° C.: (i) from slightly moistened HH, where the Water/HH ratio is between 0.07 and 0.15, preferably 0.10, by the formation of "hydrogen bonds with reduced dynamics"; (ii) from moistened DH by a suspension of urea-formaldehyde resin; (iii) from DH whose crystals have their surface covered by a thin coating of a hydrophilic polymer, as the formaldehyde based resins, such as polyvinyl alcohol, or as polyvinyl acetate. In the foregoing embodiment the method may be characterized by such hydrophilic polymers becoming insoluble after drying.

In another embodiment the preparation method of gypsum parts may be characterized by the preparation method of the calcium sulfate hemihydrate parts, HH, involving direct compaction between 30 and 100° C.: (i) use of slightly moistened HH with Water/HH ratio between 0.05 and 0.10, preferably 0.08, by the formation of "hydrogen bonds with reduced dynamics"; (ii) from HH crystals covered by a thin layer of urea-formaldehyde resin or polyvinyl alcohol or insoluble polyvinyl acetate after drying. In the foregoing embodiment the method may be characterized by such resins developing cross-linkings during drying.

These and other embodiments are described in more detail in the following detailed descriptions and the figures.

The foregoing is not intended to be an exhaustive list of embodiments and features of the inventive subject matter. Persons skilled in the art are capable of appreciating other embodiments and features from the following detailed description in conjunction with the drawings.

BRIEF DESCRIPTION OF THE DRAWINGS

The following figure shows an embodiment according to the inventive subject matter, unless noted as showing prior art.

DETAILED DESCRIPTION

Figure 1:
FIG. 1 shows the microstructure of a gypsum parts according to the inventive subject matter.
Figure 2:
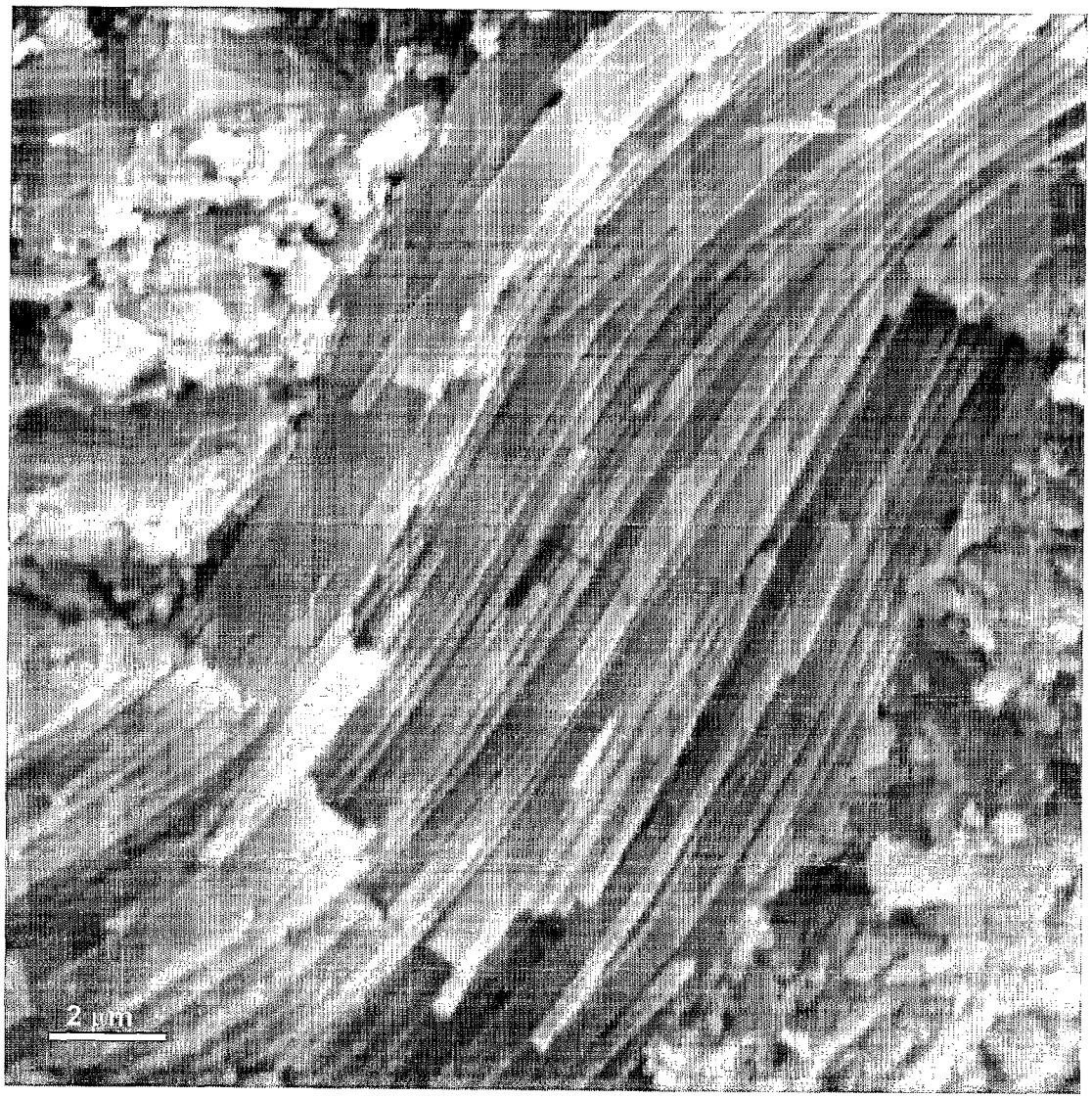
FIG. 2 shows the microstructure of a gypsum part according to the inventive subject matter after undergoing plastic deformation.
Figure 3:
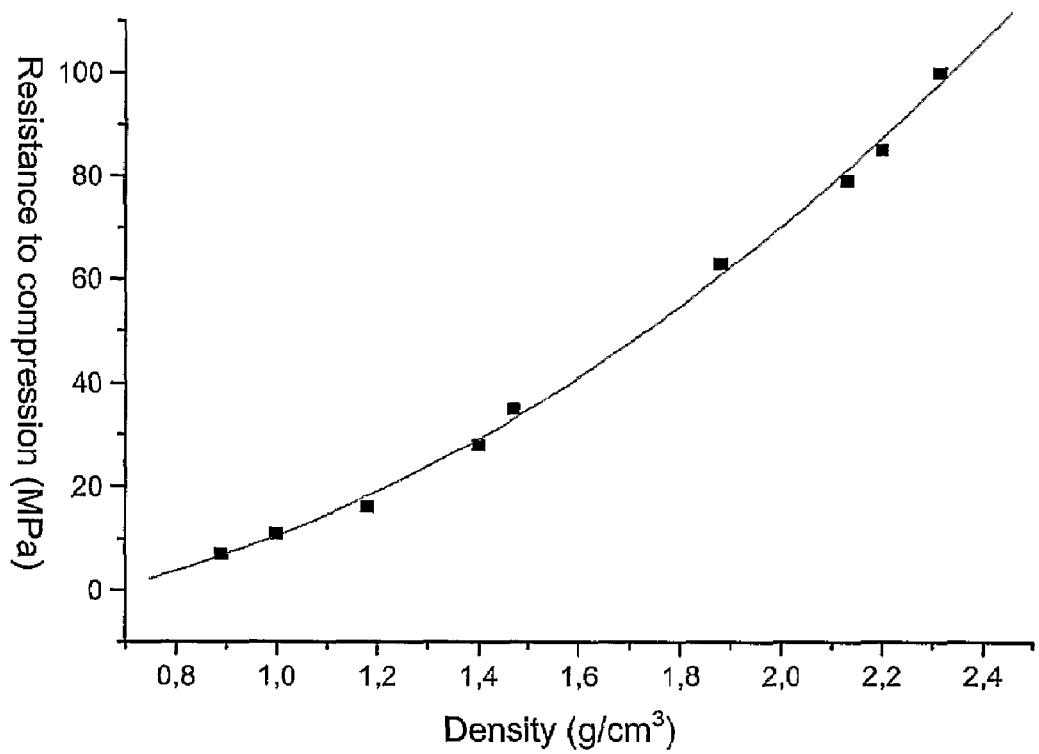
FIGS. 3A-3B are charts that relate density to compressive and bending strength according to the inventive subject matter.
Figure 3:
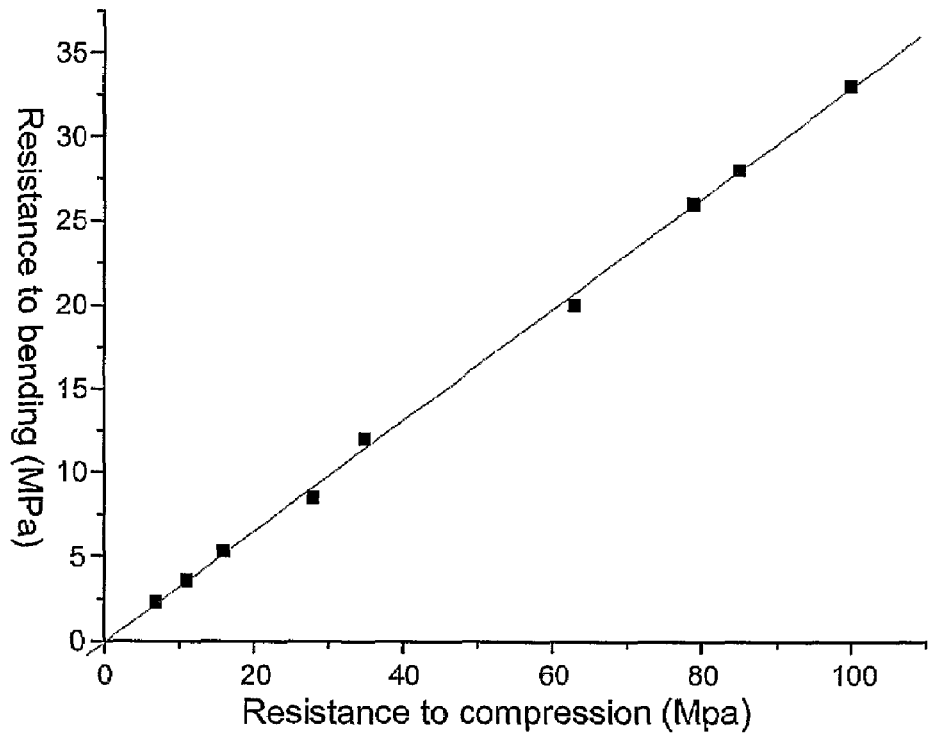

Representative embodiments according to the inventive subject matter are shown in FIGS. 1-3 wherein the same or generally similar features share common reference numerals The fundamental characteristic of the UCOS method of the present invention lies in the adherence as a result of the "hydrogen bridges with reduced dynamics" among the DH, HH crystals and among the DH and HH crystals. When there is water exudation during compression and a smaller than necessary quantity of water for the total hydration of HH remains, HH crystals mixed to those of DH will remain. Since "hydrogen bridges with reduced dynamics" are established between these two different crystals, the mechanical resistance of the formed part is not at risk.

EXAMPLES

Example 1

Gypsum slabs were prepared, with dimensions of 120.0× 60.0×2.0 cm³ from humidification of 23 kg of hemihydrate β per 4.6 kg of water, uniaxially compacted and dried at 50° C., by (UCOS) the present method. Humidification was performed by aspersion of water droplets produced by a pulverization nozzle in a mixing system that keeps the hemihydrate powder fluidized. Compaction was done by uniaxial compression with pressure equivalent to 10 MPa, i.e., 720 tons of weight over the slab. Density reached 1.870 g/cm³ and resistance to bending and compression, measured after drying at 50° C. for 24 hours, were 23±1 and 65±3 MPa, respectively. The charts in FIGS. 3A and 3B relate density with resistance to compression and resistance to bending for the slabs prepared by the method of the hereby present invention (UCOS) with different levels of compaction, with drying at 50° C.

Example 2

Plaster slabs prepared as described in Example 1, however, using calcium sulfate hemihydrate, HH, obtained by the dehydrating of phosphogypsum, a substance which results of production of phosphoric acid for agricultural use. In the event the pH of HH is acid, it can be corrected during its humidification, with a calcium hydroxide solution in order to transform the gypsum to be obtained into neutral. The mechanical resistance to bending and compression of the slabs obtained after 24 h drying at 50° C. were 21±2 and 62±5 MPa, respectively.

Example 3

Plaster slabs, prepared as described in Example 1, however, using HH obtained from the phosphogypsum, which results from the industrial production of soluble calcium phosphate for animal food. The mechanical resistance to bending and compression of the slabs obtained after 24 h drying at 50° C. were 22±2 and 63±4 MPa, respectively.

Example 4

Plaster slabs prepared as described in Example 2, however, with HH obtained from the dehydration of calcium sulfate dihydrate, DH, which results from the desulphurization of combustibles, such as gas obtained from bituminous schist. The mechanical resistance to compression and bending found is similar to the one in Example 2.

Example 5

The plaster slabs prepared with admixtures of mineral HHβ and calcium sulfate hemihydrate, HH, as the ones used in Examples 2, 3 and 4, obtained from industrial processes, using the same moistening, compression and final drying procedure as the slabs described in Example 1, presented mechanical resistance to bending and to compression, which do not depend very much on the proportion among hemihydrates of different origins. The values found for $\sigma_b$ and $\sigma_c$ were and 22±3 and 63±6 MPa, respectively.

Example 6

Plaster slabs with an addition of 26 weight of urea-formaldehyde resin were prepared from mineral originated HHβ in a ratio of W/HH=0.20, compacted at 10, 20 and 30 MPa and dried at 50° C. A suspension containing 10% mass of urea-formaldehyde resin was used in the humidification.

TABLE 2

Characteristics of the slabs prepared from mineral HHβ, W/HH = 0.20, to which 2% of its weight in resin was incorporated. Compacting was performed under different pressures. Measurements were carried out at 22° C.

| Polymer | Compacting (MPa) | $\sigma_c$ (MPa) | $\sigma_b$ (MPa) | Density (g/cm³) |
|---|---|---|---|---|
| Urea-formaldehyde | 10 | 50.0 | 17.5 | 1.86 |
| | 20 | 60.0 | 21.0 | 1.94 |
| | 30 | 75.0 | 25.0 | 1.97 |

Example 7

Plaster slats prepared with newspaper fiber addition in a 1.0, 10.0, and 20.0% proportion, in relation to the HH mass. Initially, the dry paper fibers were treated in a high rotation disintegrator. Subsequent to this and in the same disintegrator, the fibers were humidified through aspersion of a resin water solution of urea formaldehyde at a 15% concentration of resin.

Then the fibers were transferred to a fluidized-bed mixer where the HH powder was already in motion. In sequence, the powder mixture with the fiber was moistened by the same solution until it reached the values indicated in Table 3. The compaction pressure was of 20 MPa. The mechanical prop erties and density of the slabs obtained and dried at 50° C., are shown in Table 3.

TABLE 3

Composites made of paper plaster-fiber with addition of urea-formaldehyde resin. Compaction done at 20 MPa. Relative composition for 100 g of HH.

| Paper (g) | Resin (g) | Water (g) | Density (g/cm³) | $\sigma_c$ (MPa) | $\sigma_b$ (MPa) |
|---|---|---|---|---|---|
| 1.0 | 0.25 | 21 | 1.87 | 65.0 | 30.0 |
| 10.0 | 2.5 | 25 | 1.50 | 55.0 | 30.0 |
| 20.0 | 5.0 | 35 | 1.46 | 38.0 | 25.0 |

Example 8

Plaster slabs measuring 10×10×0.5 cm³, were prepared from the plaster powder, calcium sulfate dihydrate, humidified by aspersion at a relation of Water/DH=0.05 in mass. Afterward, the slightly humidified powder was compacted by high pressure so that the DH crystals could approximate sufficiently in order to establish many "hydrogen bridges with reduced dynamics". Table 4 illustrates the characteristics of the obtained slabs.

TABLE 4

Gypsum slabs, DH, prepared by compacting slightly humidified DH powder, W/DH = 0.05. Resistance to compression, $\sigma_c$ and to bending, $\sigma_b$; Sample G compressed at 70 MPa for 5 h; Sample H compressed at 90 MPa for 5 h.

| Sample | $\sigma_c$ (MPa) | $\sigma_b$ (MPa) | Density (g/cm³) | Relative Density (%) |
|---|---|---|---|---|
| G | 75 | 27 ± 1 | 2.13 ± 0.02 | 92.05 |
| H | 85 | 30 ± 1 | 2.20 ± 0.02 | 95.07 |

The slabs referent to sample H, uniaxially compressed in a steel matrix, exhibit a shiny upper surface and the lateral side with two colors. The color of the lower lateral surface is white, characteristic of plaster, while the upper part is beige. Such effect clearly shows the decrease of compression in the lower layers due to the friction with the matrix walls. The color beige in the upper part is not due to impurities, but to an optic effect, resulting from the compaction process. This same effect appears in the plaster mineral extracted from Araripina/PE, Brazil. By scanning electron microscope (SEM) exam, it was observed that elevated pressures applied during long periods of time, cause plastic deformation of the DH crystals, as seen in FIG. 2, where the microstructure of the shown plaster slab was obtained from compacting slightly moistened DH powder, W/HH=0.05, compacted at 100 MPa for 4.0 hours.

Example 9

Gypsum slabs, DH, 10×10×0.5 cm³/were prepared by DH powder compaction, with part of them being humidified by a concentrated aqueous solution of polyvinyl alcohol and another part by a concentrated aqueous solution of urea-formaldehyde resin. Incorporation of the hydrophilic polymers has the function of investigating the lubricant activity of the polymer on the compression of the DH particles during compaction process, as well as the binding activity among the DH crystals at two temperatures. The gypsum powder, DH, with mean granulometry of 2.0 µm was humidified by means of polymer suspensions in order to add 1.0% polymer weight to DH slabs. Tables 5A and 5B abridge the attained results.

TABLE 5A

Properties of gypsum slabs prepared directly from DH powder with 1.0% polymer weight, by compression at 50° C. for 15 min. Measurements performed at 25° C.

| Polymer | Compression (MPa) | $\sigma_c$ (MPa) | $\sigma_b$ (MPa) | Density (g/cm³) |
|---|---|---|---|---|
| Polyvinyl Alcohol | 20.0 | 15.0 | 8.5 | 1.55 |
| | 40.0 | 10.0 | 4.8 | 1.77 |
| | 60.0 | 10.0 | 4.1 | 1.88 |
| | 80.0 | 15.0 | 7.9 | 2.04 |
| | 100.0 | 40.0 | 16.0 | 2.07 |
| Urea-Formaldehyde | 20.0 | 15.0 | 9.0 | 1.57 |
| | 40.0 | 35.0 | 14.0 | 1.73 |
| | 60.0 | 45.0 | 16.8 | 1.91 |
| | 80.0 | 45.0 | 17.0 | 1.96 |
| | 100.0 | 60.0 | 25.0 | 2.01 |

Both polymers contribute toward diminishing compression time, thus rendering to the gypsum form sufficient mechanical resistance for various applications. Density increases with compaction pressure; however, the mechanical resistance of the slabs containing polyvinyl alcohol presents an irregular behavior with the increase of pressure. By comparing Tables 5A and 5B, one can see that the temperature increase accelerates the compaction process and in the case of the polyvinyl alcohol reduces its viscosity.

TABLE 5B

Properties of plaster slabs prepared directly from DH powder with 1.0% polymer weight, by compression at 100° C. for 15 min. Measurements performed at 25° C.

| Polymer | Compression (MPa) | $\sigma_c$ (MPa) | $\sigma_b$ (MPa) | Density (g/cm³) |
|---|---|---|---|---|
| Polyvinyl Alcohol | 20.0 | 40.0 | 15.0 | 1.84 |
| | 40.0 | 40.0 | 23.0 | 2.04 |
| | 60.0 | 40.0 | 15.0 | 2.19 |
| | 80.0 | 30.0 | 10.0 | 2.18 |
| | 100.0 | 70.0 | 28.0 | 2.21 |
| Urea-formaldehyde | 20.0 | 12.0 | 5.0 | 1.72 |
| | 40.0 | 40.0 | 15.0 | 1.92 |
| | 60.0 | 60.0 | 24.0 | 2.03 |
| | 80.0 | 58.0 | 23.0 | 2.09 |
| | 100.0 | 70.0 | 27.0 | 2.18 |

Example 10

HH plaster slats, calcium sulfate hemihydrate, 10×10×0.5 cm³, W/HH=0.05, were prepared by water aspersion on the HH powder, similarly performed as in Example 8. The compression of the dry DH powders, as well as those of dry HH (not humidified) results in slabs with extremely low mechanical resistance. The results obtained (Table 6) are a consequence of the hydrophilic nature of the HH crystals, therefore, the adherence in these crystals are also attained by hydrogen bridges. Different from DH slabs, compression does not result in a beige coloring appearing on the lateral surface of the slab.

TABLE 6

Calcium sulfate hemihydrate slabs, HH, prepared by means of compaction of slightly moistened HH powder A/DH = 0.05. Resistance to compression, $\sigma_c$ and to bending, $\sigma_b$; of an HH slab compressed at 100 MPa for 5.0 h.

| Sample | $\sigma_c$ (MPa) | $\sigma_b$ (MPa) | Density (g/cm³) | Relative Density (%) |
|---|---|---|---|---|
| HH | 75 | 27 ± 1 | 2.51 ± 0.02 | 94.0 |

The method can also include additional stages of superficial treatment through paints, resins or sealing substances.

Compaction by applying pressure can be uniaxial, biaxial or isostatic or uni/biaxial compaction by modules with pairs of densification rolls, similar to what occurs in the lamination process. Furthermore, compaction can be attained in more than one stage by controlling the hydration time of the hydrating process by means of retardant substances, as for example, citric acid.

Drying can begin after the HH hydration and done in such a way that DH dehydration does not occur.

The method can still provide gypsum that has a fraction of HH crystals. The mechanical resistance resulting in hydrogen bridges among DH crystals, HH crystals and among DH and HH crystals. The presence of HH after the hydration process can take place due to the ejection of water during compaction, transforming the Water/HH relation to less than 0.186. Also, it can happen when a lesser content of water is intentionally used to moisten. In such cases, the gypsum part will contain a fraction of HH.

It is worth remembering that gypsum composites obtained through such method can contain vegetal residues such as; (i) gypsum with lignocellulosic fibers, especially paper fibers, from pineapple leaves, bamboo leaves and other vegetables, (ii) powdered wood, and (iii) coconut powder and fiber. Such composites aim at reducing density, costs and increasing thermal and acoustic isolation of plaster slabs. Such composites can attain 60% weight of fiber. The preparation process involves: (i) individualizing particles or fibers of the residues; (ii) moistening particles and/or fibers in a suspension of polyvinyl acetate based glue, or urea-formaldehyde or phenol-formaldehyde, incorporating in this process from 1 to 5% glue weight in relation to the weight of the composite; (iii) mixing HH to moistened fibers/particles, preferably in a rapid fluidized-bed mixer and, simultaneously, incorporating from 20 to 35%, preferably 25% water to the mixture, such water containing substances such as sodium benzoate, that are able to protect fibers from microbiological attack; (iv) compaction; (v) drying at a temperature from 20 to 70° C. The method still helps in the preparation of gypsum-inorganic material composites such as gypsum-sand, gypsum-granite powder or other inorganic residues that are compatible with gypsum. This preparation process involves: (i) granulometric selection of the inorganic material; (ii) moistening the inorganic powder with an adhesive suspension, as polyvinyl acetate (PVAc) or urea-formaldehyde resin, with additives that can transform the adhesives into insoluble compounds after drying; (iii) mixture of already humidified HH powder, preferably in fast fluidized-bed mixer; (iv) compaction; (v) drying.

Increase on mechanical resistance of gypsum can also be obtained, especially its tenaciousness, i.e., reinforcement against crack propagation, by incorporating lignocellulosic fibers, as those pertaining to carauá, sisal, fibers of pineapple leaves, paper, cellulose microfibril/nanofibril or synthetic fibers such as polyvinyl alcohol fibers, protected from microbiological attack by sodium benzoate or an equivalent substance, and polypropylene fibers. The preparation process involves a uniform mixture of the fibers to the plaster, preferably following these steps: (i) separation of the fibers; (ii) coating the lignocellulosic fiber with a hydrophilic adhesive, as the urea-formaldehyde resin, for example; (iii) progressive mixing of the humidified plaster to the fibers; (iv) compaction; (v) drying.

Another option to prepare plaster parts, DH, by direct compaction between 30 and 100° C.: (i) from slightly humidified DH, where the Water/DH relation is between 0.07 and 0.15, preferably 0.10, by the formation of "hydrogen bridges with reduced dynamics"; (ii) from humidified DH by a suspension of urea-formaldehyde resin; (iii) from DH whose crystals have their surface covered by a thin coating of a hydrophilic polymer similar to formaldehyde based resins, such as polyvinyl alcohol or polyvinyl acetate. These polymers become insoluble after drying, i.e., they develop crossed bonds while they are drying.

Alternatively, preparation of calcium sulfate hemihydrate parts, HH, by direct compaction between 30 and 100° C.: (i) from slightly humidified HH with Water/HH relation between 0.05 and 0.10, preferably 0.08, by the formation of "hydrogen bridges with reduced dynamics", (ii) from HH crystals covered by a thin coating of urea-formaldehyde resin or alcohol polyvinyl or insoluble polyvinyl acetate after drying, i.e., resins that develop crossed bonds while they are drying.

For those proficient in the technique, it is evident that various modifications may be made in the method or in the shape of parts without departing from the spirit and scope of the present invention.

The invention claimed is:

1. A gypsum part having increased mechanical strength, comprising crystals of DH and/or HH calcium sulfate wherein the gypsum part is characterized by adhesion of hydrophilic surfaces of the DH or the HH crystals to each other via hydrogen bonding with a thin layer of interstitial water between the surfaces, the layer of water thereby providing a structural connection between the crystals with reduced dynamics among water molecules;

where a preparation method of the gypsum part uses HH calcium sulfate powder from mineral origin or from chemical processes as the starting material and is characterized by the following steps:
(i) humidification of HH calcium sulfate powder,
(ii) compaction of humidified powder;
(iii) drying at temperatures around 20 degrees C. to 70 degrees C.;
characterized by the drying being performed between 60 degrees C. and 50 degrees C.;
characterized by the drying time between 2 and 12 h; and
where the method is characterized by the additional step of surface treatment of the part by means of paints, resins and/or sealing substances.

2. A gypsum part having increased mechanical strength, comprising crystals of DH and/or HH calcium sulfate wherein the gypsum part is characterized by adhesion of hydrophilic surfaces of the DH or the HH crystals to each other via hydrogen bonding with a thin layer of interstitial water between the surfaces, the layer of water thereby providing a structural connection between the crystals with reduced dynamics among water molecules;

characterized by deriving hemihydrates from mineral plaster or chemical plaster; and characterized by the adherence among the crystals occurring by means of hydrophilic polymers.

3. A gypsum part having increased mechanical strength, comprising crystals of DH and/or HH calcium sulfate wherein the gypsum part is characterized by adhesion of hydrophilic surfaces of the DH or the HH crystals to each other via hydrogen bonding with a thin layer of interstitial water between the surfaces, the layer of water thereby providing a structural connection between the crystals with reduced dynamics among water molecules; and characterized by preparing the part by direct compaction between 30 degrees C. and 100 degrees C. from:
  (i) slightly moistened DH calcium sulfate, where the Water/DH ratio is between 0.07 and 0.15;
  (ii) moistened DH by a suspension of urea-formaldehyde resin; or
  (iii) DH calcium sulfate whose crystals have their surface covered by a thin coating of a hydrophilic polymer.

4. The part according to claim 3, characterized by such hydrophilic polymers becoming insoluble in water after drying.

5. A gypsum part having increased mechanical strength, comprising crystals of DH and/or HH calcium sulfate wherein the gypsum part is characterized by adhesion of hydrophilic surfaces of the DH or the HH crystals to each other via hydrogen bonding with a thin layer of interstitial water between the surfaces, the layer of water thereby providing a structural connection between the crystals with reduced dynamics among water molecules; and characterized by the preparation method of the part involving direct compaction between 30 degrees C. and 100 degrees C.:
  (i) using slightly moistened HH with Water/HH ratio between 0.05 and 0.10; or
  (ii) using HH crystals covered by a thin layer of urea-formaldehyde resin or polyvinyl alcohol or insoluble polyvinyl acetate after drying.

* * * * *